(12) United States Patent
Vannerot

(10) Patent No.: US 11,253,916 B2
(45) Date of Patent: Feb. 22, 2022

(54) METHOD OF PRODUCTION USING MELTING AND HOT ISOSTATIC PRESSING

(71) Applicant: APPLICATIONS ADDITIVES AVANCEES, Nogent (FR)

(72) Inventor: Philippe Vannerot, Saints-geosmes (FR)

(73) Assignee: ADDUP, Cebazat (FR)

( * ) Notice: Subject to any disclaimer, the term of this patent is extended or adjusted under 35 U.S.C. 154(b) by 0 days.

(21) Appl. No.: 15/770,353

(22) PCT Filed: Oct. 21, 2016

(86) PCT No.: PCT/FR2016/052735
§ 371 (c)(1),
(2) Date: Apr. 23, 2018

(87) PCT Pub. No.: WO2017/068300
PCT Pub. Date: Apr. 27, 2017

(65) Prior Publication Data
US 2018/0304366 A1 Oct. 25, 2018

(30) Foreign Application Priority Data
Oct. 23, 2015 (FR) ...................................... 1560121

(51) Int. Cl.
*B22F 3/15* (2006.01)
*B22F 5/10* (2006.01)
(Continued)

(52) U.S. Cl.
CPC .................. *B22F 3/15* (2013.01); *B22F 5/10* (2013.01); *B22F 10/20* (2021.01); *B33Y 10/00* (2014.12);
(Continued)

(58) Field of Classification Search
CPC .. B22F 3/15; B22F 5/10; B22F 3/1055; B22F 2998/10; B22F 10/20; B22F 10/00;
(Continued)

(56) References Cited

U.S. PATENT DOCUMENTS 9,180,010 B2 11/2015 Dong et al.
9,844,913 B2 12/2017 Bessac et al.
(Continued)

FOREIGN PATENT DOCUMENTS

CN 1861296 A 11/2006
CN 103752823 A 4/2014
(Continued)

OTHER PUBLICATIONS

I. Gibson, D.W. Rosen, and B. Stucker, Additive Manufacturing Technologies, DOI 10.1007/978-1-4419-1120-9_1, Springer Science+Business Media, LLC 2010 (Gibson). (Year: 2010).*

(Continued)

*Primary Examiner* — Rebecca Janssen
(74) *Attorney, Agent, or Firm* — Venable LLP

(57) ABSTRACT

A method is provided for producing a three-dimensional object that includes an external skin, a 3D mesh enclosed in the skin and having a portion that penetrates at least a part of a thickness of the skin, and an unmelted portion enclosed in the skin. The object is formed from superposed layers each including an outer edge and an inner mesh, with the superposed outer edges forming the skin, and with the superposed inner meshes forming the 3D mesh. Each superposed layer is formed by scanning a powder layer using an energy beam to form micro-connections between grains of the powder without melting the metal powder. First and second melting and solidifying steps are performed using the (Continued)

energy beam to form the outer edge in one of the first and second steps and the inner mesh in the other of the first and second steps.

8 Claims, 1 Drawing Sheet

(51) Int. Cl.
| | | |
|---|---|---|
| *B22F 10/20* | (2021.01) | |
| *B33Y 10/00* | (2015.01) | |
| *B23K 15/00* | (2006.01) | |
| *B33Y 40/00* | (2020.01) | |
| *B33Y 80/00* | (2015.01) | |

(52) U.S. Cl.
CPC .............. *B33Y 40/00* (2014.12); *B33Y 80/00* (2014.12); *B22F 2998/10* (2013.01); *B23K 15/0086* (2013.01); *Y02P 10/25* (2015.11)

(58) Field of Classification Search
CPC ......... B33Y 80/00; B33Y 40/00; B33Y 10/00; B23K 15/0086; Y02P 10/295; Y02P 10/25
See application file for complete search history.

(56) References Cited

U.S. PATENT DOCUMENTS

| | | | | |
|---|---|---|---|---|
| 2012/0321878 | A1* | 12/2012 | Landon | .................... A61L 27/56 |
| | | | | 428/304.4 |
| 2013/0268085 | A1 | 10/2013 | Dong et al. | |
| 2014/0348692 | A1* | 11/2014 | Bessac | .................. B22F 3/1055 |
| | | | | 419/53 |
| 2015/0018956 | A1 | 1/2015 | Steinmann et al. | |
| 2015/0306667 | A1* | 10/2015 | Yao | ........................ B22F 3/1055 |
| | | | | 419/54 |
| 2016/0098495 | A1 | 4/2016 | Dong et al. | |
| 2016/0375493 | A1* | 12/2016 | Stoyanov | ............... B33Y 10/00 |
| | | | | 419/6 |

FOREIGN PATENT DOCUMENTS

| | | | |
|---|---|---|---|
| CN | 104010749 A | | 8/2014 |
| CN | 104550950 A | | 4/2015 |
| CN | 104550950 B | * | 9/2015 |
| EP | 0 168 593 A2 | | 1/1986 |
| EP | 1 800 700 A2 | | 6/2007 |
| EP | 2 647 453 A2 | | 10/2013 |
| JP | 2005-171299 A | | 6/2005 |
| WO | WO 2013/092997 A1 | | 6/2013 |
| WO | WO 2014/179679 A1 | | 11/2014 |

OTHER PUBLICATIONS

Mar. 21, 2017 International Search Report and Written Opinion in International Patent Appln. No. PCT/FR2016/052735.

Jul. 12, 2016 French Preliminary Search Report in French Patent Appln. No. FR1560121.

* cited by examiner

METHOD OF PRODUCTION USING MELTING AND HOT ISOSTATIC PRESSING

FIELD OF THE INVENTION

The present invention relates to the field of powder metallurgy in which metallic parts are obtained by sintering of metal powders.

More particularly, in a particularly innovative way the present method combines powder metallurgy with methods of additive manufacturing, i.e., methods for forming a part by addition of material, especially by a stack of successive layers.

The present invention will apply mainly to the field of methods for manufacturing a part whereof the process of forming of said part is a physical process, in particular a melting process followed by solidification of metal powders.

RELATED ART

In classic methods of powder metallurgy, powders are generally encapsulated in a solid metal enclosure which has been previously designed specifically for the part to be manufactured prior to conducting a step for hot isostatic pressing (HIP).

But due to diffusion welding, the HIP step will cause compacting of powders, most of which are melted, which is not easy to control and which has to be taken into account prior to manufacturing of the part in question.

As for current methods for forming a part by additive manufacturing, traditionally these consist of making a three-dimensional (3D) part from digital data by application, to a support, of thin successive two-dimensional (2D) layers by means of a powder-deposition roller.

Forming is associated for example with an electron beam which successively scans each layer and causes local melting of powders.

Solidification occurs directly after the power source is turned off.

The finished product is obtained by way of some finishing operations, comprising especially cleaning of the part, removal of supports, sanding and machining.

Methods currently being employed in additive manufacturing have some disadvantages, however.

In particular, for manufacturing parts of considerable size, having a size greater than or equal to 2-3 mm, it is necessary to construct adapted supports supporting the part in construction and enabling discharge of released heat.

In fact, as indicated earlier, for melting then solidification of powders, additive manufacturing requires application of a power source, generally an electron beam or a laser beam. The electron beam for example consists of a source of narrow and intense three-dimensional heat whereof the temperature can reach, or even exceed, 1,600° C. and can range up to 3,000° C. As a consequence, without the presence of supports for supporting and discharging heat, the finished parts would have serious deformations relative to the form to be attained.

The use of supports, useful on the one hand for preventing the presence of deformations on the finished product, presents disadvantages on the other hand.

More particularly, when the supports are removed and once solidification is complete, it is necessary to detach them from the part. The consequence of this operation is to create surface defects at the site where said part was in contact with the support. A sanding step is necessary to rectify the presence of these surface defects.

For example, patent document WO 2013/092997 describes a method for manufacturing a three-dimensional object by successive consolidation, layer by layer, wherein:
a powder layer is deposited onto a support;
melting of the periphery of the powder layer is executed by a laser beam;
melting of the full internal central portion of the powder layer is executed by application of an electron beam.

Implementing these steps would produce parts having minimal surface roughness to the exterior.

However, the method described here has some disadvantages and especially that of needing the use of two power sources, according to whether the core of the part or the skin of the latter is to be melted.

BRIEF DESCRIPTION OF EMBODIMENTS OF THE INVENTION

With respect to the present invention, in an inventive step the latter proposes a particularly interesting and original combination of techniques for powder metallurgy and additive manufacturing to arrive at a method conducting a succession of steps to finally arrive at three-dimensional parts or objects which can be large in size and have a dense and homogeneous inner structure, said objects capable of exhibiting and further having highly complex forms without requiring the sometimes restrictive use of supports for supporting the structure during manufacturing.

It should also be noted that the parts obtained by implementing the method of the invention has exceptional characteristics, especially in mechanical and isotropic terms.

For this purpose, the present invention relates to a method for manufacturing a three-dimensional object from a stack of powder layers, said three-dimensional object comprising an external skin and an inner three-dimensional mesh, said object being formed by superposition of several powder layers each including at least one outer edge enclosing a central portion comprising an inner mesh, superposition of the outer edges of the layers forming said external skin of the object and superposition of the inner meshes of the layers forming said inner three-dimensional mesh of the object, a method wherein:

a) a powder layer of total surface $S1$ is deposited onto a work plate;

b) integral scanning of a surface $S2$ contained in $S1$ is carried out by means of an energy beam, for example an electron beam, as a function of the three-dimensional object to be produced so as to form microconnections between the powder grains of said surface $S2$;

c) during a first melting-solidification step, melting of the outer edge or the inner mesh is performed by means of said energy beam, the latter penetrating a portion of the width of said outer edge;

d) during a second melting-solidification step, melting of the element selected from the outer edge or the inner mesh which has not been solidified during said first melting-solidification step, is performed by means of said energy beam so as to twice melt the portion of said mesh penetrating said outer edge;

e) steps a) to d) are repeated n times so as to form n layers of superposed metal powder and produce said three-dimensional object;

f) hot isostatic pressing of the three-dimensional object is carried out.

The presence of an inner three-dimensional mesh in part penetrating the external skin enables effective discharge towards the exterior of the layer of heat produced by the power source used to enable the melting-solidification of the powders.

Advantageously, the power source used during melting-solidification steps c) and d) consists of an electron beam, as for scanning step b).

According to another particular feature of the invention, all the steps are preferably conducted in an atmosphere under vacuum.

It is interesting that the meshes of the inner three-dimensional mesh of the three-dimensional object form a plurality of dodecahedrons, or all other geometric forms producing a uniform mesh or having a size gradient.

The width in cross-section of the meshes of the three-dimensional mesh of the three-dimensional object is preferably between 0.50 and 3.50 mm.

In an advantageous example of the method of additive manufacturing according to the invention, the inner mesh is penetrated into the outer edge of about 0.1 to 0.9 mm.

The invention has many advantages and rectifies the disadvantages of the methods of the prior art in an original way.

On the one hand, the method of the invention supplies a solution for avoiding the placing of supports during manufacturing of large-size three-dimensional parts, said supports generally being at the origin of the formation of surface defects which are to be rectified.

On the other hand, the three-dimensional mesh put in place during the present method, and in part penetrating the outer edge, or skin, promotes elimination of heat which is necessarily produced during melting of powders by means of the power source.

It should also be noted that the method of the invention is both simple and rapid to implement.

Also, and above all, step b) during which scanning of an entire surface S2 of the deposited powder layer, this step b) being conducted prior to melting-solidification steps c) and d), will enable micro-connections to be put in place between the powder grains, but without that the powder grains melt.

These micro-connections advantageously have dimensions of the order of a micrometer, for example a few micrometers and preferably between 1 and 3 µm, give the powder a particular consistency in which the grains of said powder are not free without being fully melted.

This structure, or consistency, of powders obtained following conducting step b), and for each of the powder layers, in combination with producing the external casing and the inner mesh by melting-solidification, enables homogeneous and controlled compacting of the object which finally has exceptional characteristics during the final step of hot isostatic pressing.

Therefore, in the method of the invention is conducted a step of hot isostatic pressing on a three-dimensional object, or a part, wherein inside the external casing, and to the exclusion of the latter, more than 90% of the volume of the powder has not undergone melting and a certain proportion of space of the order of 20 to 30% remains between the grains.

The HIP step will eliminate this space between the non-melted grains, but between which micro-connections have been previously set up.

In combination with the presence of an inner three-dimensional mesh in the region of which the powder grains have undergone melting, the residual proportion of space before the HIP will enable, when the HIP is being conducted, regular homogeneous deformation of the three-dimensional object which will give this object an isotropic inner structure, thin and homogeneous, resulting especially in optimal mechanical characteristics.

By comparison, in the methods of the prior art, when HIP is applied to material whereof the powder grains have already been melted almost completely, dimensional removal is very often irregular and the final part is likely to have a deformed appearance. For example, instead of producing a part of preferred circular cross-section, which results from executing the invention, a deformed non-circular part known as "potato-like" generally results.

BRIEF DESCRIPTION OF THE DRAWINGS

Other characteristics and advantages of the invention will emerge from the following detailed description of non-limiting embodiments of the invention in reference to the appended figures, wherein.

DETAILED DESCRIPTION OF EMBODIMENTS OF THE INVENTION

Figure 1:
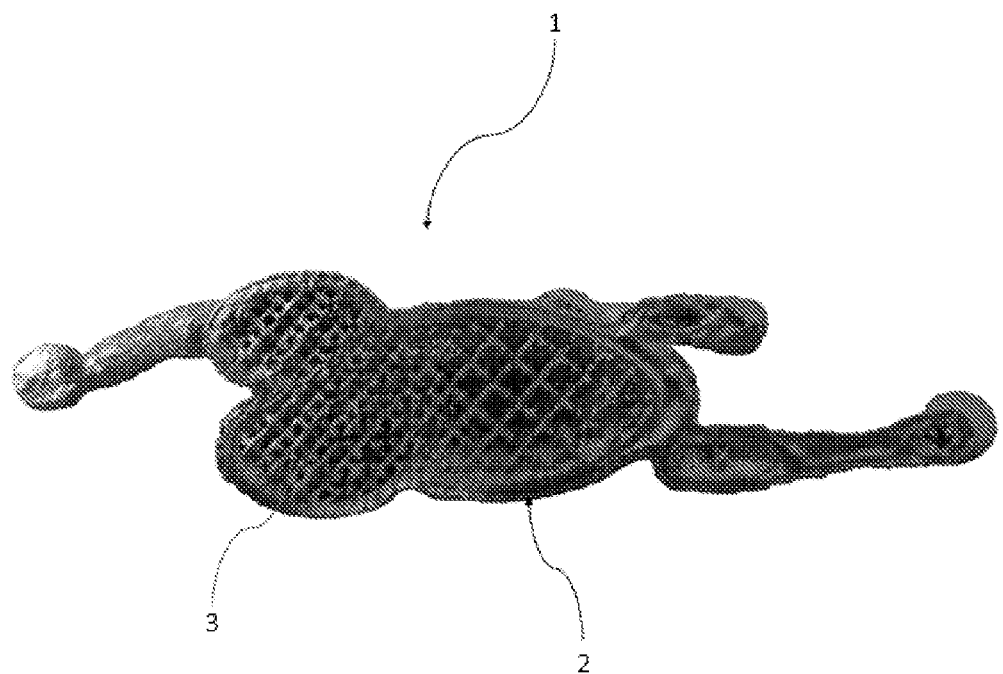
FIG. 1 illustrates a plan view of a longitudinal section of a three-dimensional object, in this case a figurine representing a horse obtained by conducting the steps of the method according to the invention, and illustrating the external skin and the inner three-dimensional mesh of the object.
Figure 2:
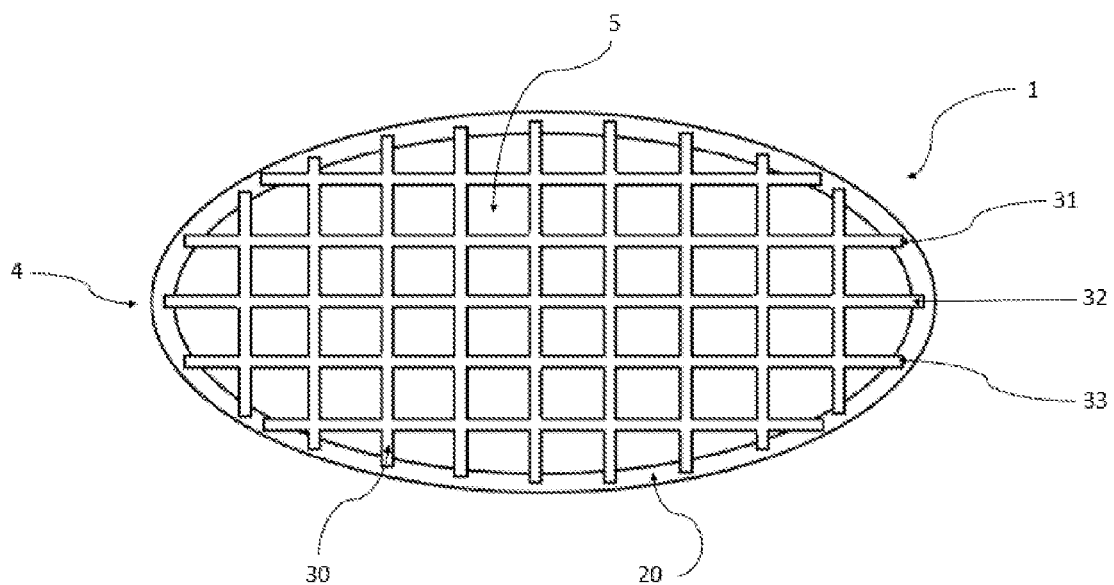
FIG. 2 schematically illustrates a plan view of one of the layers of the three-dimensional object obtained by conducting the steps of the method according to the invention; in this figure, it is more particularly evident that the three-dimensional mesh of the layer penetrates a portion of the width of the external skin of said layer.

As shown in FIGS. 1 and 2, the present invention relates to a method for manufacturing a three-dimensional object 1.

A manufacturing method according to the invention consists more precisely of forming a three-dimensional object 1 by superposition of a plurality of thin layers 4 of powder(s), generally metallic, the powder able to be melted in some places of the layer 4 by means of an energy source or energy beam.

With respect to the powder used in the method of the invention, this is generally a metal powder comprising a single metal or a mixture, or alloy, of several metals.

However, such an embodiment must not be considered as being limiting, and the powder used in the method of the invention can also consist of a ceramic powder, for example.

In a particular embodiment, as the different steps of the present method are being performed a "doped" powder is used, i.e., one in which the grains, preferably metallic, are associated with nanoparticles.

As for the size of the powder particles, this varies preferably between 5 and 500 µm.

It is interesting that this boosts the mechanical properties of the three-dimensional object 1 obtained finally by means of the method of the invention. In particular, said object 1 has better dimensional stability at high temperature and improved resistance to any machining steps. A functionalized material can also be obtained by these means.

In reference now again to the three-dimensional object 1, in reference to FIG. 1, the structure of the latter comprises both an external skin 2 and an inner three-dimensional mesh 3.

More precisely, in reference now to FIG. 2, said three-dimensional object 1 is formed by a plurality of powder layers 4, and each of these layers 4 includes an outer edge 20, or peripheral edge 20, which encloses a central portion 5, the latter comprising an inner mesh 30.

It is understood that superposition of the outer edges 20 of the powder layers 4 finally forms the external skin 2 of the three-dimensional object 1.

With respect to superposition of the inner mesh 30 of the layers 4, the latter produces the inner three-dimensional mesh 3 of the object 1 in question.

To do this, in a first step a) of the method of the invention, a first metal powder layer 4, of total surface S1, is deposited preferably on a substantially planar surface such as a work plate.

Throughout this first step a), the depositing of the powder layer 4 can be performed by any means adapted for this purpose and known to those skilled in the art, especially including means for distributing and spreading the powder.

The deposited powder layer 4 generally has a thickness of the order of a few tens of μm. For example, but non-limiting, the thickness of said layer 4 is about 50 μm, without exceeding 200 μm however.

Following application of the first powder layer 4, especially of metal powder during step a), integral scanning of a surface S2 contained within the surface S1 of the powder layer 4 which has been spread is conducted by means of an energy beam.

The surface S2 which is scanned in its entirety during this step b) depends on the shape of the three-dimensional object 1 that is desired in the end.

So, for example, the powder layer 4 which is deposited can have a surface S1 of rectangular shape, while a circular surface S2 contained in S1 is scanned during step b).

It is also possible that the entire surface S1 which has been spread during step a) is scanned by means of the energy beam. In this case, S1 is equal to S2.

The energy beam preferably consists of an electron beam.

The applicant has determined particularly advantageously and originally that conducting this scanning step at this point during the method, following deposit step a) and preceding the melting-solidification steps c) and d), causes formation of micro-connections between the grains of the powder, without any melting occurring.

The rise in temperature by application of the electron beam promotes diffusion of powder grains enabling micro-welding between the latter, whereof the size is of the order of a micrometer, without going as far as melting the grains.

The result is an original structure in which the grains are micro-connected or micro-welded together.

The powder grains are consequently no longer free in the sense where they can no longer flow freely, while retaining a proportion of space at the interstices between the powder grains.

The proportion of space varies preferably from 20 to 40%, this proportion of space corresponding to the surface relative to the scanned surface S2, for each powder layer 4, or to the volume of space relative to the total volume of the three-dimensional object 1 obtained after application of steps a) to e).

Following step b) of integral scanning of a surface S2 by means of an electron beam, a first step c) of melting-solidification is then conducted by means of a power source.

In a preferred embodiment, the power source used during execution of the present method, and especially during this step c), is an electron beam via which the powder particles are bombarded by electrons launched at high speed, and whereof the kinetic energy enables heat generation at the time of impact with the particles. This heat is enough to cause melting of said powder particles, then solidification of the latter when cooling.

The different steps of the method of the invention are advantageously performed under vacuum, for example in a sealed enclosure placed and maintained under vacuum by means of a vacuum pump.

Especially and advantageously this prevents generation of gases between the powder particles necessarily having to be discharged as a result. This means also prevents the phenomena of oxidation and enables proper functioning of the electron beam.

During this first step c) of melting-solidification, melting either of the outer edge 20 of the powder layer 4, or melting of the inner mesh 30 can equally be carried out, given particularly interestingly that at least one portion of the meshes, for example 31, 32, 33, of said inner mesh 30 penetrates a portion of the width of said outer edge 20.

Preferably, and as shown in the appended FIG. 2, all the meshes of the inner mesh penetrate a portion of the width of said outer edge 20.

Following melting of the powder at the outer edge 20, by means of the power source, the solidification of the powder particles, by welding them together, occurs directly after the stopping of said power source.

A second melting-solidification step d) is then performed, preferably also by means of an electron beam constituting the power source.

During this step d), the element which has not been subjected to the power source during the preceding step c), either the outer edge 20, or the inner mesh 30, undergoes melting in turn.

In this way, more specifically, if the first step c) of melting-solidification has melted the powder layer 4 at its outer edge 20, the second step d) of melting-solidification performs melting of the inner mesh 30, the meshes 31, 32, 33 of the latter in part at least impinging on said outer edge 20.

On the contrary, where the first step c) of melting-solidification has enabled melting of the powder of the inner mesh 30, the second melting-solidification during step d) must enable welding of the powder at the peripheral edge 20 of the layer 4.

Given that the inner mesh 30 in part penetrates the peripheral edge 20 of the powder layer 4, the powder particles, at this level, undergo the two melting-solidification steps.

Also, since this double melting-solidification is carried out for each of the layers 4, at the final three-dimensional object 1, an inner three-dimensional mesh 3 results which penetrates at least one portion of the thickness of the external skin 2.

This "double-melting" of the material, at the site where the inner mesh 30 in part penetrates the edge 20, promotes heat exchange between the outer edge 20 and the central portion 5 between the meshes of the inner mesh 30 and towards the exterior of the object 1.

As a consequence, the fact that the inner mesh 30 penetrates the outer edge 20 enables particularly effective discharge of the heat which is emitted by the power source during treatment of each of the layers 4 resulting in manufacturing of the object 1.

This prevents for example any explosion of the parts during their production by additive manufacturing under the effect of heat released by the power source during melting operations.

Also, once the three-dimensional object 1 is obtained by superposition of the layers 4 during conducting of the ultimate step of the method, which consists of HIP (step f), this interpenetration of the inner three-dimensional mesh 30 in the outer edge 20 will cause regular deformation of the three-dimensional object 1 finally obtained.

The steps of depositing powder a), integral scanning b) and melting-solidification c) and d) are repeated as many times as necessary to obtain the preferred three-dimensional object 1.

In a particularly advantageous way, the entirety of the first powder layer 4 is melted, as is the entirety of the last powder layer, to obtain a three-dimensional object 1 in the shape of a shell comprising an external skin 2 and an inner three-dimensional mesh 3, between which the particles of non-melted but micro-connected powders are maintained prior to the final step of hot isostatic pressing.

Currently as to the inner three-dimensional mesh 3 of said three-dimensional object 1, once the latter is finished, it is advantageously a cross mesh marking out volumes, and even more advantageously dodecahedral forms, which improve discharge of heat towards the exterior of the meshes or of the object 1 all the more.

However, such an embodiment must not be considered as being limiting of the invention, and the three-dimensional mesh 3 of the finished object 1 can also have meshes marking out a plurality of cubic forms, for example as shown in the appended FIG. 2, or even pyramidal, or any other homogeneous geometric figure or one having a dimensional gradient. This means that the meshes of the mesh 3 close to the external skin 2 can optionally have a smaller cross-section than that of the meshes of the mesh 3 internal to the central portion.

Quite preferably, in the method of the invention a different melting path, defined by digital data means, is performed for each of the layers 4 during steps c) or d), to produce a three-dimensional cross mesh, marking out volumes.

As to the current dimensions of the different elements of the object, it is advantageous for example that the width, in cross-section, of the meshes of the inner three-dimensional mesh 3 of the object 1, is between 0.50 and 3.50 mm.

In fact, it has been determined that this width promotes particularly efficacious discharge of energy emitted by the electron beam especially.

The meshes, for example 31, 32 and 33 of the inner mesh 30 of each layer 4 advantageously penetrate preferably the width of the outer edge 20 by a few tens of millimeters, for example between 0.1 and 0.9 mm, according to the width of said edge 20, which as such is preferably between 1.0 and 5.0 mm.

According to a particular feature of the method, already mentioned previously, by conducting step b), between said meshes, for example 31, 32, 33, of the inner mesh 30, the powder grains or powder particles do not undergo melting but are micro-welded together by means of micro-connections. Consequently, the three-dimensional object 1 also incorporates, in its interior, non-melted powder particles and space between these particles.

More precisely, more than 90% and more preferably more than 95% of the final mass, to the exclusion of the external skin 2, of the three-dimensional object 1, obtained by conducting the method of the invention is constituted by grains of non-melted powders.

Doping elements added to the metal powder, such as nanoparticles, can advantageously be used which could vaporize or aggregate during dissolution carried out conventionally.

Also, the fact of maintaining the particles of non-melted powder in place, between the meshes 31, 32, 33 of the mesh 30, as also the presence of the mesh 3, especially promotes producing a particularly compact and homogeneous three-dimensional object 1 after a later step f) of hot isostatic pressing (HIP).

This also facilitates transfer and discharge of heat generated during the method of additive manufacturing according to the invention.

In other words, repetition especially of steps b), c) and d), on the one hand, of setting up micro-connections between the powder particles with maintenance of interstices between the latter and, on the other hand, an inner three-dimensional mesh 3, the latter in part penetrating the external skin 2 of the object 1, at the time of the HIP of step f) causes homogeneous dimensional retraction which produces a final part.

The HIP technique more particularly constitutes heat treatment of the three-dimensional object 1 obtained after conducting steps a) to e) described hereinabove, and especially employing high pressure to improve the properties of said object.

This compression can be obtained preferably using an inert gas, for example argon. Application over a certain time of high temperature and pressure produces improvement in the characteristics of the final object 1.

The present invention is particularly interesting and advantageous for manufacturing three-dimensional parts 1 of relatively wide dimensions, more particularly having dimensions of the order of a millimeter and up to several decimeters, by dispensing with the often restrictive use of supports functioning as shores.

Also, as opposed to methods conventionally employed in powder metallurgy, the method of the invention does not require use of a solid metal enclosure for the HIP.

The invention claimed is:

1. A method for manufacturing an object from a stack of powder layers, wherein the object includes an external skin and an inner three-dimensional mesh, the object being formed by superposition of a plurality of powder layers each including an outer edge enclosing a central portion that includes an inner mesh, the external skin being formed by superposition of the outer edges of the layers, and the inner three-dimensional mesh being formed by superposition of the inner meshes of the layers, the method comprising, in the following order, steps of:
   (a) depositing a layer of metal powder onto a work plate, the layer of metal powder having a total surface S1;
   (b) integrally scanning a surface S2 contained in the total surface S1 using an electron beam so as to form micro-connections between grains of the metal powder of the internal surface S2 without melting the metal powder, the scanning being performed as a function of a structure of a three-dimensional object to be produced;
   (c) a first melting and solidifying, in the surface S2, using the electron beam to form one of: an outer edge and an inner mesh in the layer of metal powder, wherein, if the inner mesh is formed, the first melting and solidifying penetrates into a portion of a width of the outer edge;
   (d) a second melting and solidifying, in the surface S2, using the electron beam to form a different one of: the outer edge and the inner mesh of the layer of metal powder, the different one being different from the one formed in the first melting and solidifying, wherein completion of steps (c) and (d) causes the portion of the width of the outer edge to be melted and solidified twice;

(e) repeating the steps (a) through (d) n times so as to form n superposed layers, the n superposed layers forming a three-dimensional object, wherein grains of non-melted metal powder are maintained in between the inner meshes of the central portion of the three-dimensional object; and (f) subjecting the three-dimensional object to hot isostatic pressing to eliminate a space between the grains of non-melted metal powder which micro-connections formed during step (b).

2. The method according to claim 1, wherein the steps (a) through (f) are performed under a vacuum.

3. The method according to claim 1, wherein the inner three-dimensional mesh has a plurality of dodecahedral shapes.

4. The method according to claim 1, wherein each of the inner meshes has a width in a range between 0.50 mm and 3.50 mm.

5. The method according to claim 1,
wherein the outer edge has a width in a range between 1.0 mm and 5 mm, and
wherein each inner mesh penetrates into the outer edge between 0.1 mm and 0.9 mm.

6. The method according to claim 1, wherein the space between the grains of non-melted metal powder which micro-connections formed during step (b) is maintained through step (e).

7. A method for manufacturing an object from a stack of powder layers, wherein the object includes an external skin and an inner three-dimensional mesh, the object being formed by superposition of a plurality of powder layers each including an outer edge enclosing a central portion that includes an inner mesh, the external skin being formed by superposition of the outer edges of the layers, and the inner three-dimensional mesh being formed by superposition of the inner meshes of the layers, the method comprising, in the following order, steps of:

(a) depositing a layer of metal powder onto a work plate, the layer of metal powder having a total surface S1;

(b) integrally scanning a surface S2 contained in the total surface S1 using an electron beam so as to form micro-connections between grains of the metal powder of the internal surface S2 without melting the metal powder, the scanning being performed as a function of a structure of a three-dimensional object to be produced;

(c) a first melting and solidifying, in the surface S2, using the electron beam to form one of: an outer edge and an inner mesh in the layer of metal powder, wherein, if the inner mesh is formed, the first melting and solidifying penetrates into a portion of a width of the outer edge;

(d) a second melting and solidifying, in the surface S2, using the electron beam to form a different one of: the outer edge and the inner mesh of the layer of metal powder, the different one being different from the one formed in the first melting and solidifying, wherein completion of steps (c) and (d) causes the portion of the width of the outer edge to be melted and solidified twice;

(e) repeating the steps (a) through (d) n times so as to form n superposed layers, the n superposed layers forming a three-dimensional object, wherein grains of non-melted metal powder are maintained in between the inner meshes of the central portion of the three-dimensional object and constitute at least 90% of the final mass, excluding the external skin, of the three-dimensional object; and (f) subjecting the three-dimensional object to hot isostatic pressing to eliminate a space between the grains of non-melted metal powder which micro-connections formed during step (b).

8. A method for manufacturing an object from a stack of powder layers, wherein the object includes an external skin and an inner three-dimensional mesh, the object being formed by superposition of a plurality of powder layers each including an outer edge enclosing a central portion that includes an inner mesh, the external skin being formed by superposition of the outer edges of the layers, and the inner three-dimensional mesh being formed by superposition of the inner meshes of the layers, the method comprising, in the following order, steps of:

(a) depositing a layer of metal powder onto a work plate, the layer of metal powder having a total surface S1;

(b) integrally scanning a surface S2 contained in the total surface S1 using an electron beam so as to form micro-connections between grains of the metal powder of the internal surface S2 without melting the metal powder, the scanning being performed as a function of a structure of a three-dimensional object to be produced;

(c) a first melting and solidifying, in the surface S2, using the electron beam to form one of: an outer edge and an inner mesh in the layer of metal powder, wherein, if the inner mesh is formed, the first melting and solidifying penetrates into a portion of a width of the outer edge;

(d) a second melting and solidifying, in the surface S2, using the electron beam to form a different one of: the outer edge and the inner mesh of the layer of metal powder, the different one being different from the one formed in the first melting and solidifying, wherein completion of steps (c) and (d) causes the portion of the width of the outer edge to be melted and solidified twice;

(e) repeating the steps (a) through (d) n times so as to form n superposed layers, the n superposed layers forming a three-dimensional object, wherein grains of non-melted metal powder are maintained in between the inner meshes of the central portion of the three-dimensional object; and (f) subjecting the three-dimensional object to hot isostatic pressing to eliminate a space between the grains of non-melted metal powder which micro-connections formed during step (b), wherein the outer edge has a width in a range between 1.0 mm and 5 mm, wherein each of the inner meshes has a width in a range between 0.50 mm and 3.50 mm, and wherein each inner mesh penetrates into the outer edge between 0.1 mm and 0.9 mm.

* * * * *